(12) United States Patent
Jia

(10) Patent No.: US 12,373,007 B2
(45) Date of Patent: Jul. 29, 2025

(54) FLEXIBLE DISPLAY DEVICE AND SUPPORT ASSEMBLY

(71) Applicant: WUHAN CHINA STAR OPTOELECTRONICS SEMICONDUCTOR DISPLAY TECHNOLOGY CO., LTD., Hubei (CN)

(72) Inventor: Chengjie Jia, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/255,353

(22) PCT Filed: Apr. 17, 2023

(86) PCT No.: PCT/CN2023/088591
§ 371 (c)(1),
(2) Date: May 31, 2023

(87) PCT Pub. No.: WO2024/016755
PCT Pub. Date: Jan. 25, 2024

(65) Prior Publication Data
US 2024/0377861 A1    Nov. 14, 2024

(30) Foreign Application Priority Data

Jul. 21, 2022  (CN) .......................... 202210865016.3

(51) Int. Cl.
*G06F 1/16*           (2006.01)
(52) U.S. Cl.
CPC .......... *G06F 1/1656* (2013.01); *G06F 1/1624* (2013.01); *G06F 1/1652* (2013.01)

(58) Field of Classification Search
CPC .... G06F 1/1656; G06F 1/1624; G06F 1/1652; G09F 9/301; H05K 5/0217
See application file for complete search history.

(56) References Cited

U.S. PATENT DOCUMENTS 10,321,583 B2 *  6/2019  Seo .......................... H04N 5/64
11,347,336 B2 *  5/2022  Seo .......................... G06F 3/044
(Continued)

FOREIGN PATENT DOCUMENTS

CN        111664337 A       9/2020
CN        113063075 A       7/2021
(Continued)

OTHER PUBLICATIONS

International Search Report in International application No. PCT/CN2023/088591, mailed on Jun. 21, 2023.
(Continued)

*Primary Examiner* — Rockshana D Chowdhury
(74) *Attorney, Agent, or Firm* — PV IP PC; Wei Te Chung

(57) ABSTRACT

Embodiments of the present disclosure provide a flexible display device and a support assembly. The flexible display device includes a support assembly and a flexible display screen. A first support housing and a second support housing of the support assembly are slidable in a first direction by a plurality of first comb-teeth and a plurality of second comb-teeth alternately arranged. A first support portion of each of the first comb-teeth supports and abuts against a second stop portion of one of the second comb-teeth adjacent thereto, and a second support portion of each of the second comb-teeth supports and abuts against a first stop portion of one of the first comb-teeth adjacent thereto.

19 Claims, 10 Drawing Sheets

(56) References Cited

U.S. PATENT DOCUMENTS

| | | | | |
|---|---|---|---|---|
| 11,435,786 | B2* | 9/2022 | Pelissier | G06F 1/1641 |
| 11,797,050 | B2* | 10/2023 | Lim | G06F 1/1624 |
| 11,849,549 | B2* | 12/2023 | Feng | G06F 1/1681 |
| 12,019,479 | B2* | 6/2024 | Han | G06F 1/1652 |
| 12,032,403 | B2* | 7/2024 | Kim | G06F 1/1652 |
| 12,124,296 | B2* | 10/2024 | Feng | G06F 1/1637 |
| 12,144,216 | B2* | 11/2024 | Choi | H10K 77/111 |
| 12,156,461 | B2* | 11/2024 | Wang | H10K 77/111 |
| 12,181,917 | B2* | 12/2024 | Shin | G06F 1/1624 |
| 2018/0081473 | A1* | 3/2018 | Seo | G06F 1/3287 |
| 2018/0188778 | A1* | 7/2018 | Shin | G06F 1/1652 |
| 2020/0272271 | A1* | 8/2020 | Seo | G06F 1/1656 |
| 2023/0208959 | A1* | 6/2023 | Yen | G09F 9/301 |
| | | | | 455/566 |
| 2023/0324960 | A1* | 10/2023 | Hou | G06F 1/1624 |
| | | | | 361/679.01 |

FOREIGN PATENT DOCUMENTS

| | | |
|---|---|---|
| CN | 113098995 A | 7/2021 |
| CN | 113539089 A | 10/2021 |
| CN | 114244931 A | 3/2022 |
| CN | 114263819 A | 4/2022 |
| CN | 115148108 A | 10/2022 |
| KR | 20200111083 A | 9/2020 |
| WO | 2021237831 A1 | 12/2021 |

OTHER PUBLICATIONS

Written Opinion of the International Search Authority in International application No. PCT/CN2023/088591, mailed on Jun. 21, 2023.
Chinese Office Action issued in corresponding Chinese Patent Application No. 202210865016.3 dated Apr. 28, 2023, pp. 1-10.

* cited by examiner

FLEXIBLE DISPLAY DEVICE AND SUPPORT ASSEMBLY

CROSS-REFERENCE TO RELATED APPLICATIONS

This application is a National Phase of PCT Patent Application No. PCT/CN2023/088591 filed on Apr. 17, 2023, which claims the benefit of priority of Chinese Patent Application No. 202210865016.3 filed on Jul. 21, 2022. The contents of the above applications are all incorporated herein by reference in their entireties.

TECHNICAL FIELD

The present disclosure relates to the field of displaying technologies, and in particular, to a flexible display device and a support assembly.

BACKGROUND

At present, flexible display devices have gradually developed toward the devices having a large screen. In order to achieve large screen displaying and facilitate carrying, foldable screens or sliding screens are generally manufactured for the display devices.

In the display device having a sliding screen, a sliding portion of the sliding screen cannot be rigidly supported and is always in a flexible state. During the touch control and use of the sliding screen, sagging feeling may be generated when the user presses it, and the overall structure is soft and flimsy, resulting in a poor user experience.

In addition, a support assembly of the display device having the sliding screen generally includes two housings, which are sleeved together and each have a support member to support the flexible display screen. The two support members can slide relative to each other by a snap-fitting structure formed of a sleeved convex-concave configuration. The snap-fitting structure is a fully wrapped structure, and has a large contact area and a large frictional force therein. In addition, the trench in the snap-fitting structure may occupy a larger thickness, so that the internal space of the device becomes less, which seriously affects the duration of the device.

To solve the above problems, there is a need for a flexible display device with a low relative sliding friction force and a thin drawing structure.

SUMMARY

Embodiments of the present disclosure provide a flexible display device and a support assembly, which have a relatively low side-sliding friction force, smooth drawing, low abrasion degree, and a thin drawing structure, so that the volume proportion of the support assembly in the flexible display device can be effectively reduced, and the overall duration of the flexible display device can be improved.

Specifically, an embodiment of the present disclosure provides the flexible display device including:
a support assembly including a first support housing, and a second support housing slidably connected to the first support housing in a first direction; and
a flexible display screen including a first display portion and a second display portion, wherein the second support housing slides toward or away from the first support housing in the first direction, so that a light-emitting surface of the second display portion is switched between facing an opposite direction to a light-emitting surface of the first display portion and facing a same direction as the light-emitting surface of the first display portion;
wherein the first support housing includes a plurality of first comb-teeth parallel to the first direction, and the second support housing includes a plurality of second comb-teeth parallel to the first comb-teeth, each of the first comb-teeth includes a first body portion, a first support portion, and a first stop portion, and the first support portion and the first stop portion are respectively located on two sides of the first body portion facing the second comb-teeth; each of the second comb-teeth includes a second body portion, a second support portion, and a second stop portion, and the second support portion and the second stop portion are respectively located on two sides of the second body portion facing the first comb-teeth;
the first comb-teeth and the second comb-teeth are alternately arranged side by side and slidably connected to each other in the first direction, the first support portion of each of the first comb-teeth abuts against the second stop portion of adjacent one of the second comb-teeth so that the first support portion supports the second stop portion in a direction perpendicular to the light-emitting surface of the first display portion, and the second support portion of each of the second comb-teeth abuts against the first stop portion of adjacent one of the first comb-teeth so that the second support portion supports the first stop portion in the direction perpendicular to the light-emitting surface of the first display portion.

The present disclosure further provides a support assembly including:
a first support housing including a plurality of first comb-teeth parallel to a first direction, wherein each of the first comb-teeth includes a first body portion, a first support portion, and a first stop portion, and the first support portion and the first stop portion are located on two sides of the first body portion, respectively; and
a second support housing slidably connected to the first support housing in the first direction, and including a plurality of second comb-teeth parallel to the first comb-teeth, wherein each of the second comb-teeth includes a second body portion, a second support portion, and a second stop portion, and the second support portion and the second stop portion are located on two sides of the second body portion facing the first comb-teeth respectively;
wherein the first comb-teeth and the second comb-teeth are alternately arranged side by side and slidably connected to each other in the first direction, the first support portion of each of the first comb-teeth abuts against the second stop portion of adjacent one of the second comb-teeth so that the first support portion supports the second stop portion in a direction perpendicular to the first support housing, and the second support portion of each of the second comb-teeth abuts against the first stop portion of adjacent one of the first comb-teeth so that the second support portion supports the first stop portion in the direction perpendicular to the first support housing.

SUMMARY OF THE INVENTION

DETAILED DESCRIPTION OF THE EMBODIMENTS

Figure 1:
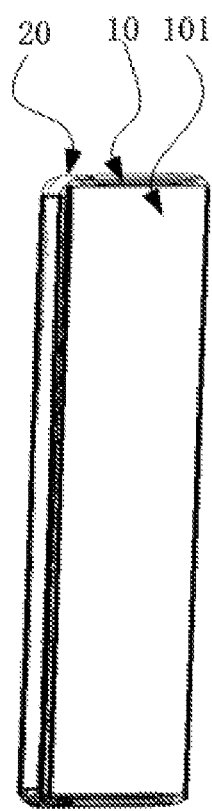
FIG. 1 is a schematic structural diagram of a flexible display device according to an embodiment of the present disclosure.

The present disclosure will be described in detail below with reference to the accompanying drawings in order to make the objective, technical solutions, and effects of the present disclosure clear and explicit. It is to be understood that the specific embodiments are described herein to explain the present disclosure and not intended limit the present disclosure.

An embodiment of the present disclosure provides a flexible display device, as shown in FIGS. 1-21, including:
  a support assembly 20 including a first support housing 201 and a second support housing 202 slidably connected to the first support housing 201 in a first direction F1;
  a flexible display screen 10 including a first display portion 101 and a second display portion 102, wherein the second support housing 202 slides toward or away from the first support housing 201 in the first direction F1, so that a light-emitting surface of the second display portion 102 is switched between facing an opposite direction to a light-emitting surface of the first display portion 101 and facing a same direction as the light-emitting surface of the first display portion 101.

The first support housing 201 includes a plurality of first comb-teeth 2012 parallel to the first direction F1, and the second support housing 202 includes a plurality of second comb-teeth 2022 parallel to the first comb-teeth 2012. Each of the first comb-teeth 2012 includes a first body portion 2012c, a first support portion 2012a, and a first stop portion 2012b. The first support portion 2012a and the first stop portion 2012b are located on two sides of the first body portion 2012c facing the second comb-teeth 2022, respectively. Each of the second comb-teeth 2022 includes a second body portion 2022c, a second support portion 2022a, and a second stop portion 2022b. The second support portion 2022a and the second stop portion 2022b are located on two sides of the second body portion 2022c facing the first comb-teeth 2012, respectively.

The first comb-teeth 2012 and the second comb-teeth 2022 are alternately arranged side by side, and are slidably connected to each other in the first direction F1. The first support portion 2012a of each of the first comb-teeth 2012 abuts against the second stop portion 2022b of adjacent one of the second comb-teeth 2022, so that the first support portion 2012a supports the second stop portion 2022b in a direction perpendicular to the light-emitting surface of the first display portion 101. The second support portion 2022a of each of the second comb-teeth 2022 abuts against the first stop portion 2012b of adjacent one of the first comb-teeth 2012, so that the second support portion 2022a supports the first stop portion 2012b in the direction perpendicular to the light-emitting surface of the first display portion 101.

It is to be noted that, the first direction F1 is a direction of retracting and stretching of the flexible display screen 10. In an embodiment, the first direction F1 is a length direction of the flexible display screen 10.

In an embodiment, the flexible display screen 10 may be a flexible organic light-emitting diode (OLED) display screen. The display screen includes a first display portion 101 and a second display portion 102 connected to the first display portion 101. There is no gap between the first display portion 101 and the second display portion 102. That is, the display screen is a monolithic piece of screen.

In an embodiment, a shady surface of the first display portion 101 may be attached to a first support surface (i.e., the plurality of first comb-teeth 2012) of the first support housing 201 by an adhesive. A side edge of the first display portion 101 away from the second display portion 102 is fixedly attached to a first backbone 2011 of the first support housing.

The second display portion 102 is disposed around the second support housing 202. A side edge of the second display portion 102 away from the first display portion 101 is disposed around a second backbone 2021, and slidably connected to a side surface of the second support housing 202 (that is, a rear surface of the second support housing 202) away from the first display portion 101.

Figure 2:
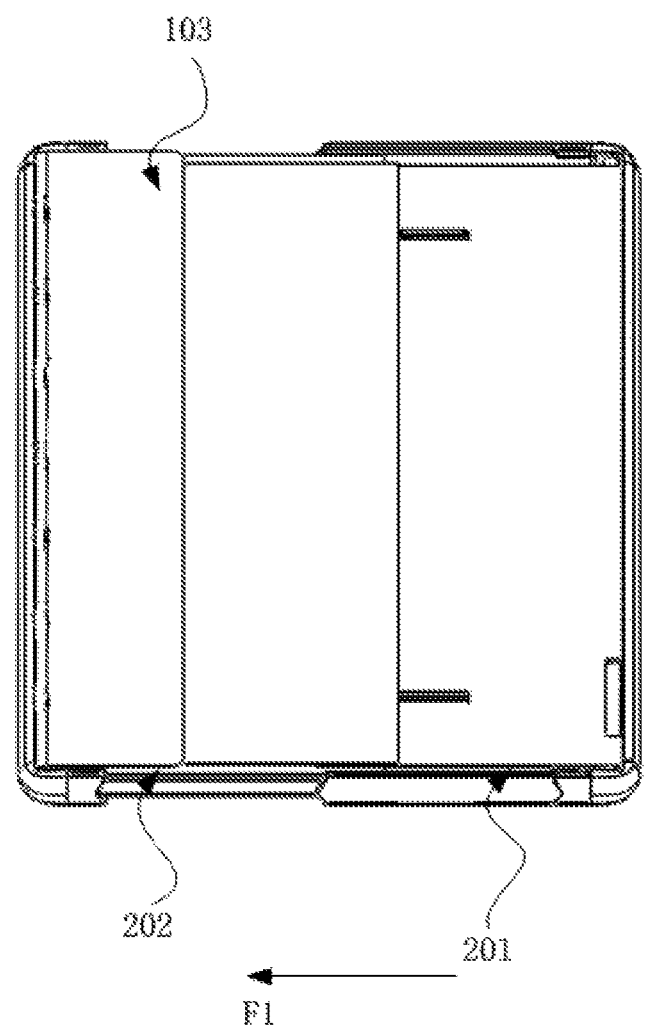
FIG. 2 is a schematic structural diagram of a flexible display device according to an embodiment of the present disclosure.
Figure 4:
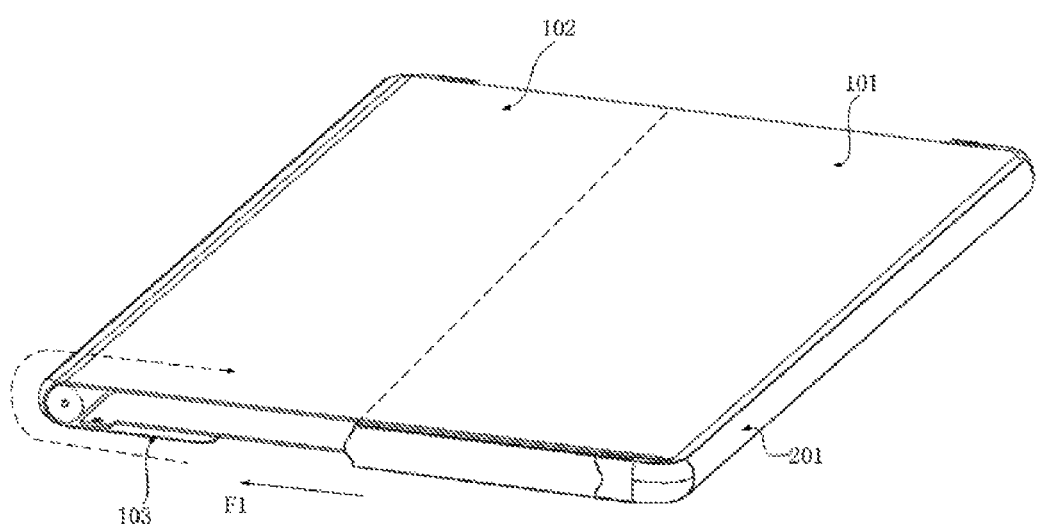
FIG. 4 is a schematic diagram of a side-slidable structure of a side-slidable screen of a flexible display device according to an embodiment of the present disclosure.
Figure 5:
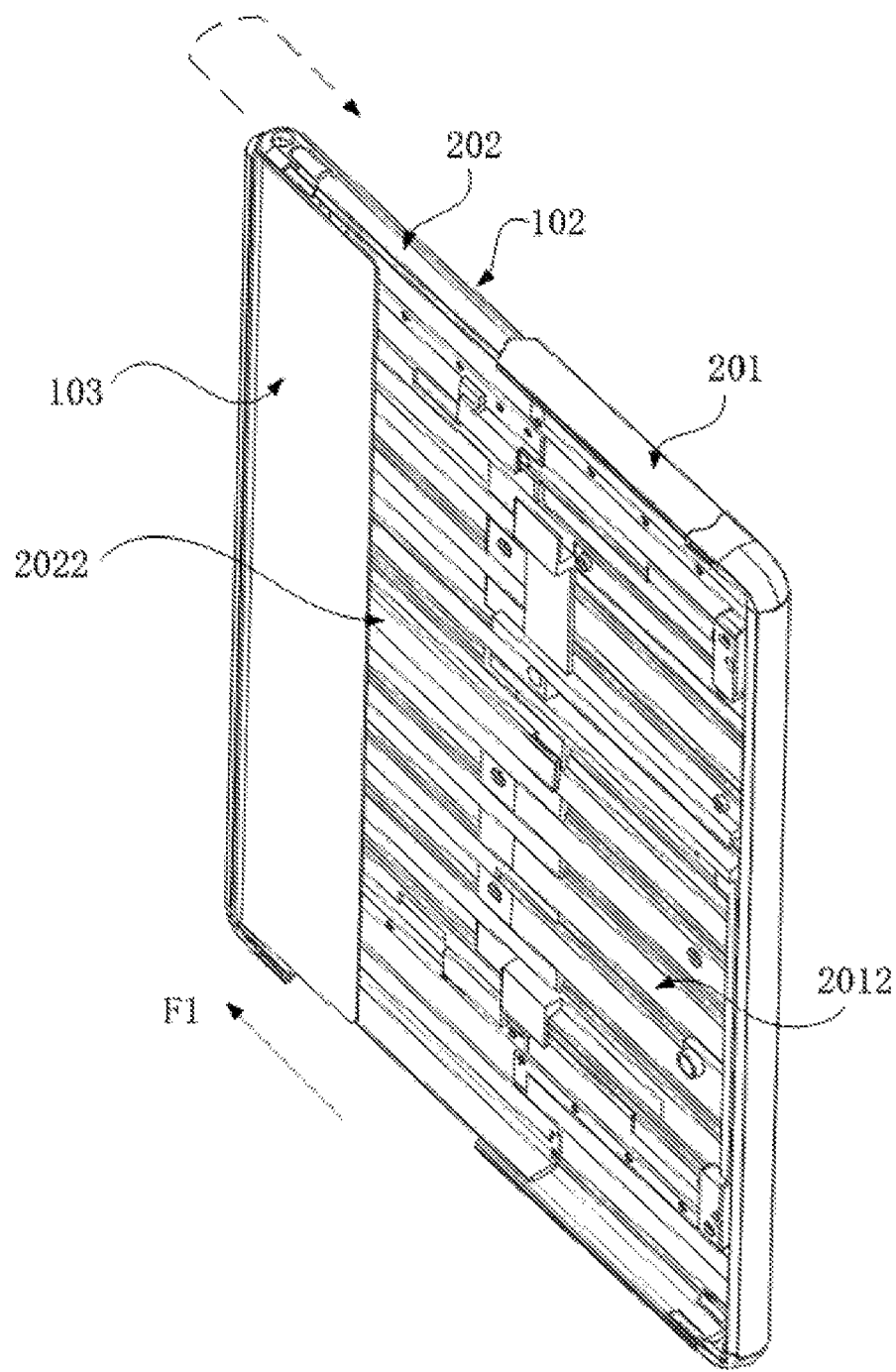
FIG. 5 is a schematic diagram of a side-slidable structure of a side-slidable screen of a flexible display device according to an embodiment of the present disclosure.

In an embodiment, as shown in FIGS. 2, 4 and 5, the first display portion 101 is fixedly connected to the first support housing 201, and the second display portion 102 is disposed around the periphery of the second support housing 202 in the first direction F1. The second display portion 102 is slidably connected to the second support housing 202 in the first direction F1. A side of the second display portion 102 away from the first display portion 101 is connected to a third display portion 103. A light-emitting surface of the third display portion 103 always faces an opposite direction to the light-emitting surface of the first display portion 101.

Figure 3:
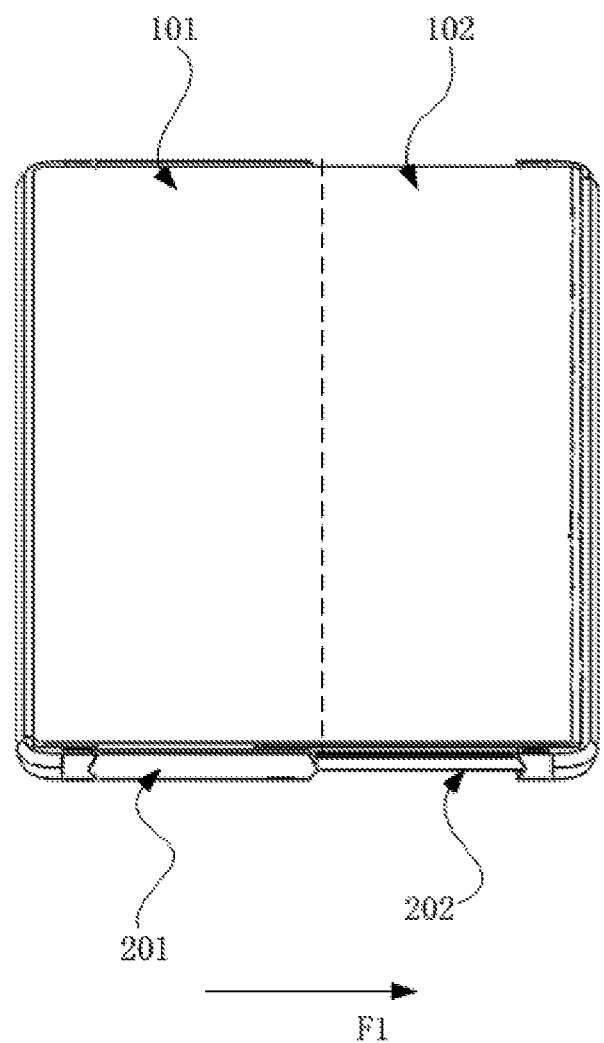
FIG. 3 is a schematic structural diagram of a flexible display device according to an embodiment of the present disclosure.

Specifically, as shown in FIGS. 1, 2, and 3, the support assembly 20 includes a first support housing 201, and a second support housing 202 slidably connected to the first support housing 201. The first support housing 201 and the second support housing 202 are matched to each other in size.

In a specific example, the size of the first support housing 201 is the same as the size of the second support housing 202. The second support housing 202 is slidably connected in the first direction F1 to the first support housing 201. The second support housing 202 slides with respect to the first support housing 201, including a retracted state and an elongated state, so that a support area of the support assembly 20 is switched between small and large areas.

Figure 6:
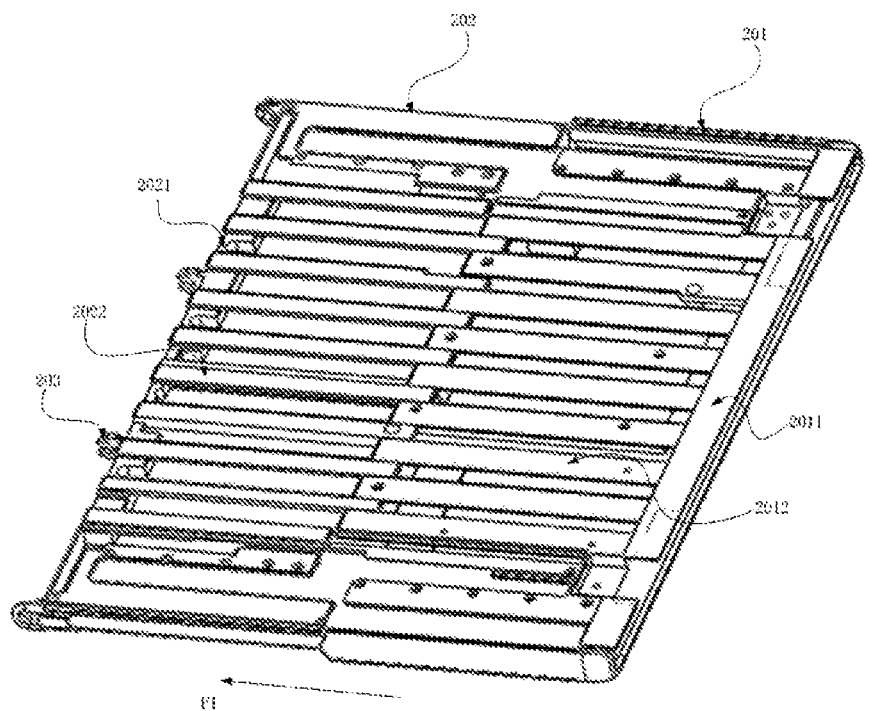
FIG. 6 is a schematic diagram of a support assembly in a stretched state according to an embodiment of the present disclosure.
Figure 8:
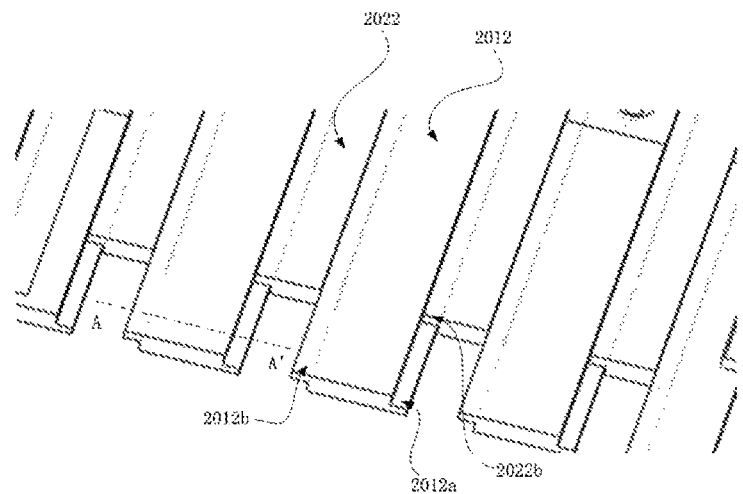
FIG. 8 is a schematic diagram of an alternate snap-fit structure of first comb-teeth and second comb-teeth according to an embodiment of the present disclosure.

Specifically, as shown in FIGS. 6 and 8, the first support housing 201 includes a comb-shaped structure, and specifically comprises a first backbone 2011 connected to the plurality of first comb-teeth 2012 which are parallel to each other. The plurality of first comb-teeth 2012 may have the same shape and size, and a length direction of the first comb-teeth 2012 is the same as the first direction F1. A side of the plurality of first comb-teeth 2012 close to the first display portion 101 constitutes the first support surface for attaching the first display portion 101.

As shown in FIGS. 4 and 5, the second support housing 202 also includes a comb-shaped structure, and specifically comprises a second backbone 2021 connected to the plurality of second comb-teeth 2022 which are parallel to each other. The plurality of second comb-teeth 2022 may have the same shape and size. Each of the second comb-teeth 2022 is disposed at a space between two adjacent first comb-teeth 2012, and the first comb-teeth 2012 and the second comb-teeth 2022 may be gap-fitted to each other. The first comb-teeth 2012 are slidably connected to the second comb-teeth 2022, and the plurality of second comb-teeth 2022 constitute a second support surface.

Specifically, a plurality of rollers parallel to the second backbone 2021 are disposed on the second backbone 2021. The plurality of rollers are coaxially disposed, and rotatably connected to the second backbone 2021 by a fixed bearing 204. A shady surface of the second display portion 102 abuts against surfaces of the rollers, so that a smooth degree of sliding of the sliding screen (that is, the second display portion 102 moves around the second support housing 202) can be improved, and a sliding load of the sliding screen of the mobile terminal can be reduced.

Specifically, a specific structure for slidably connecting the first comb-teeth 2012 to the second comb-teeth 2022 may be illustrated as follows.

Each of the first comb-teeth 2012 includes the first body portion 2012c, the first support portion 2012a, and the first stop portion 2012b, and the first support portion 2012a and the first stop portion 2012b are located on two sides of the first body portion 2012c facing the second comb-teeth 2022, respectively. The thickness of the first support portion 2012a and the first stop portion 2012b is not specifically limited, preferably less than or equal to the thickness of the first body portion.

The arrangement and the number of the first support portion 2012a and the first stop portion 2012b on each of the first comb-teeth 2012 are not limited herein. All technical solutions, in which the first support section 2012a can slide in the first direction F1 in cooperation with the second stop portion 2022b and the first stop portion 2012b can slide in the first direction F1 in cooperation with the second support portion 2022a, are within the scope of the present disclosure.

In an embodiment, a first groove and a first protrusion extending in the first direction F1 are formed on two sides of each of the first comb-teeth 2012 facing the second comb-teeth 2022, respectively. A second groove and a second protrusion extending in the first direction F1 are formed on two sides of each of the second comb-teeth 2022 facing the first comb-teeth 2012, respectively. The first comb-teeth and the second comb-teeth are slidably snap-fitted to each other by the first and second grooves and the first and second protrusions.

Figure 9:
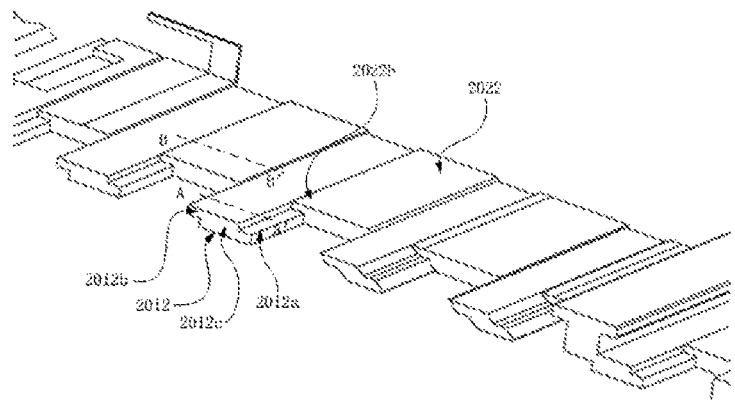
FIG. 9 is a schematic diagram of an alternate snap-fit structure of first comb-teeth and second comb-teeth according to an embodiment of the present disclosure.
Figure 10:
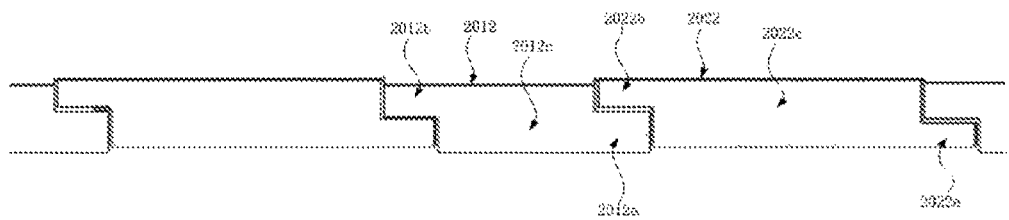
FIG. 10 is a cross-sectional view of a snap-fit structure of first comb-teeth and second comb-teeth according to an embodiment of the present disclosure.

In another embodiment, as shown in FIGS. 8, 9, and 10, a cross section (for example, a section taken along line A-A' in FIG. 8) of each of the first comb-teeth 2012 is a Z-shaped configuration (the left and right orientation of the Z-shaped configuration is not limited). That is, each of the first comb-teeth 2012 has one first support portion 2012a and one first stop portion 2012b.

Figure 11:
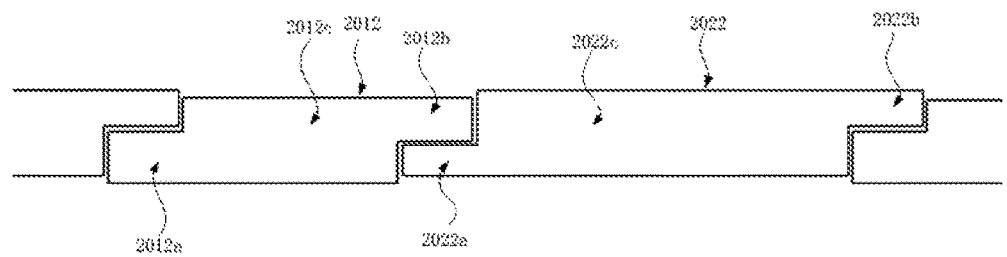
FIG. 11 is a cross-sectional view of a snap-fit structure of first comb-teeth and second comb-teeth according to another embodiment of the present disclosure.
Figure 12:
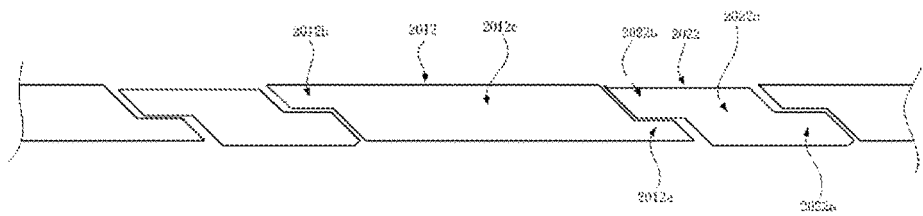
FIG. 12 is a cross-sectional view of a snap-fit structure of first comb-teeth and second comb-teeth according to another embodiment of the present disclosure.
Figure 13:
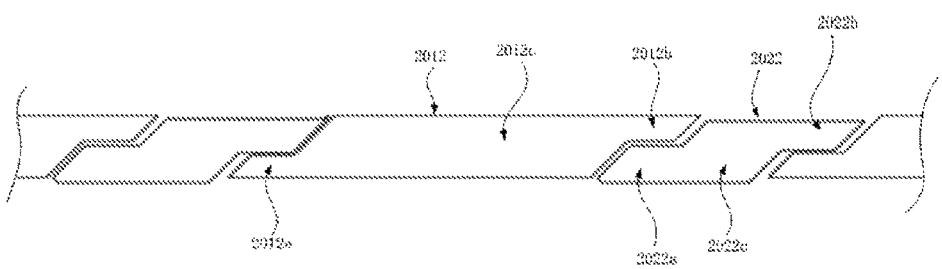
FIG. 13 is a cross-sectional view of a snap-fit structure of first comb-teeth and second comb-teeth according to an embodiment of the present disclosure.
Figure 14:
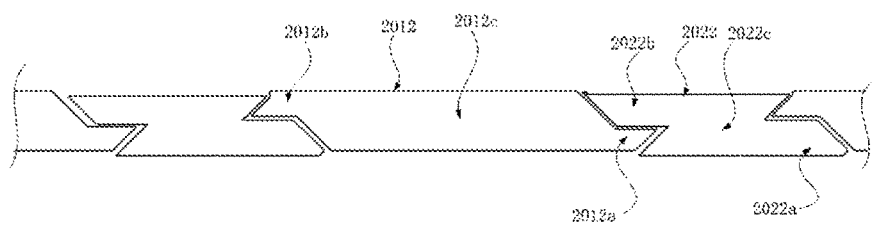
FIG. 14 is a cross-sectional view of a snap-fit structure of first comb-teeth and second comb-teeth according to an embodiment of the present disclosure.
Figure 15:
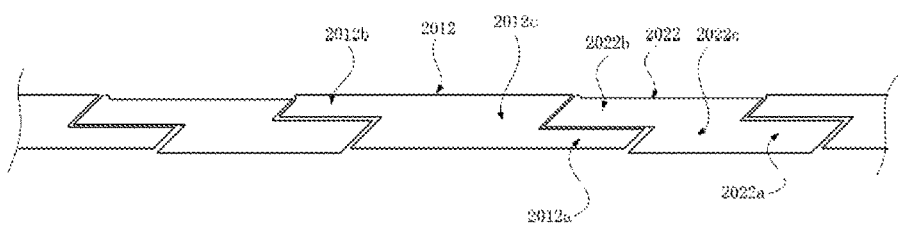
FIG. 15 is a cross-sectional view of a snap-fit structure of first comb-teeth and second comb-teeth according to an embodiment of the present disclosure.

For example, the Z-shaped configuration may be a forward Z-shaped configuration (as shown in FIG. 10) or a reverse Z-shaped configuration (as shown in FIG. 11). The first support portion 2012a and the first stop portion 2012b may have a rectangular cross section, respectively. As shown in FIGS. 12, 13, 14, and 15, the first support portion 2012a and the first stop portion 2012b may have a trapezoidal cross section, respectively, and the trapezoidal shape is not limited herein. The first support portion 2012a and the first stop portion 2012b may have a wedge-shaped cross section.

Each of the second comb-teeth 2022 includes the second body portion 2022c, the second support portion 2022a, and the second stop portion 2022b. The second support portion 2022a and the second stop portion 2022b are located on two sides of the second body portion 2022c facing the first comb-teeth 2012, respectively. The thickness of the second support portion 2022a and the second stop portion 2022b is not specifically limited, and may be less than or equal to the thickness of the second body portion.

Specifically, the arrangement and the number of the second support portion 2022a and the first stop portion 2012b on each of the second comb-teeth 2022 are not specifically limited. All technical solutions, in which the second support section 2022a can slide in the first direction F1 in cooperation with the first stop portion 2012b and the second stop portion 2022b can slide in the first direction F1 in cooperation with the first support portion 2012a, are within the scope of the present disclosure.

In an embodiment, as shown in FIGS. 8, 9, and 10, a cross section (for example, a section taken along line B-B' in FIG. 8) of each of the second comb-teeth 2022 is a Z-shaped configuration (the left and right orientation of the Z-shaped configuration is not limited). That is, each of the second comb-teeth 2022 has one second support portion 2022a and one second stop portion 2022b.

For example, the Z-shaped configuration may be a structure as shown in FIGS. 10 and 11. The second support portion 2022a and the second stop portion 2022b may have a rectangular cross section, respectively. As shown in FIGS. 12, 13, 14, and 15, the second support portion 2022a and the second stop portion 2022b may have a trapezoidal cross section, respectively, and the trapezoidal shape is not limited herein. The trapezoidal cross section of the second support portion 2022a may be same as or different from the trapezoidal cross section of the second stop portion 2022b. The second support portion 2022a and the second stop portion 2022b may have a wedge-shaped cross section, respectively.

Figure 16:
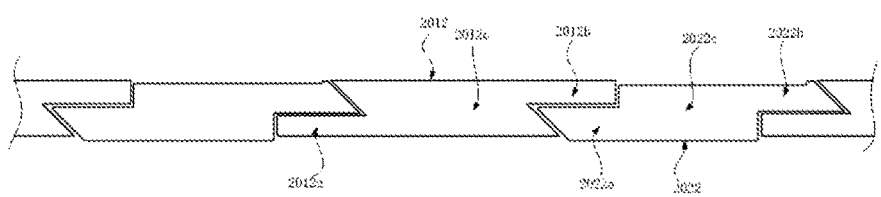
FIG. 16 is a schematic diagram of a snap-fit structure of first comb-teeth and second comb-teeth according to an embodiment of the present disclosure.

Specifically, as shown in FIG. 16, the first support portion 2012a and the first stop portion 2012b on each of the first comb-teeth 2012 have a rectangular cross section. The second support portion 2022a and the second stop portion 2022b on each of the second comb-teeth 2022 may have a trapezoidal cross section. The trapezoidal shapes of the second support portion 2022a and the second stop portion 2022b may be the same or different.

In the embodiments of the present disclosure, the first comb-teeth 2012 and the second comb-teeth 2022 are alternately arranged side by side. For example, a connection unit structure formed of one first comb-teeth portion 2012 and two second comb-teeth 2022 is exemplified as shown in FIGS. 17a and 17b.

Figure 17A:
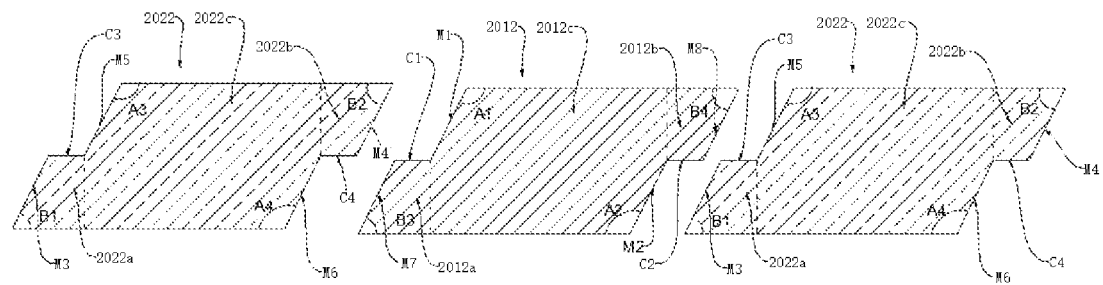
FIG. 17a is a cross-sectional view of a snap-fit structure of first comb-teeth and second comb-teeth according to an embodiment of the present disclosure.
Figure 17B:
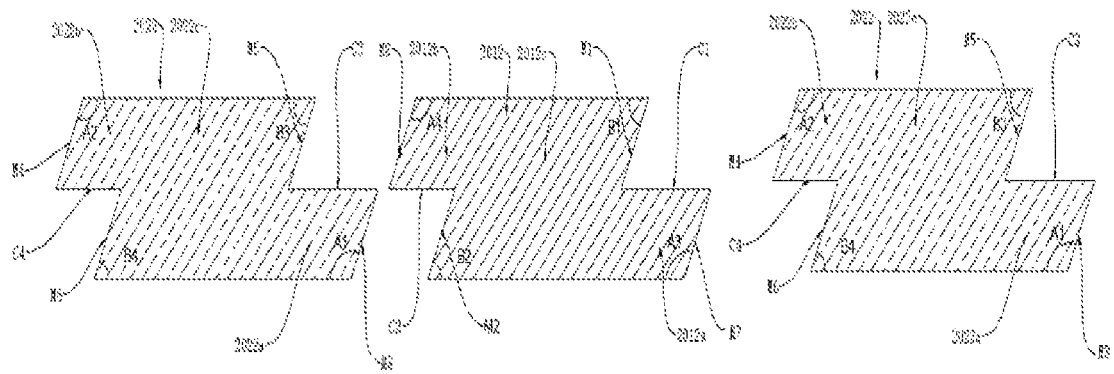
FIG. 17b is a cross-sectional view of a snap-fit structure of first comb-teeth and second comb-teeth according to another embodiment of the present disclosure.
Figure 18:
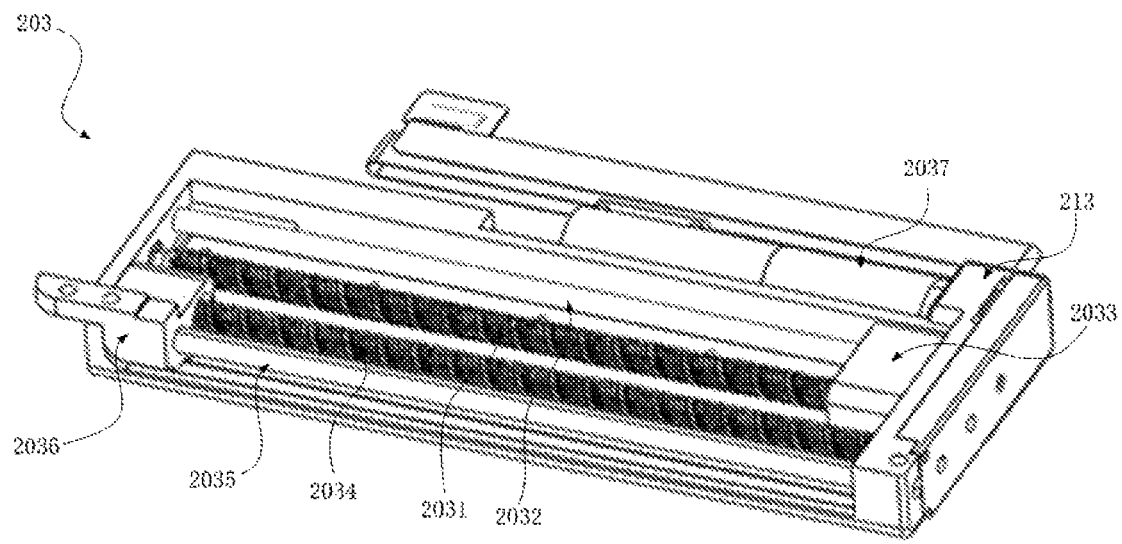
FIG. 18 is a schematic structural diagram of a slide assembly in a stretched state according to an embodiment of the present disclosure.

As shown in FIGS. 17a and 17b, the one first comb-teeth portion 2012 includes the first support portion 2012a and the first stop portion 2012b, and each of the two second comb-teeth 2022 includes the second support portion 2022a and the second stop portion 2022b. As shown in FIG. 17a, the first stop portion 2012b of the first comb-teeth portion 2012 slidably abuts against the second support portion 2022a of one of the second comb-teeth 2022 adjacent to the right side of the first comb-teeth portion 2012, and the first support portion 2012a of the first comb-teeth portion 2012 slidably abuts against the second stop portion 2022b of the other of the second comb-teeth 2022 adjacent to the left side of the first comb-teeth portion 2012. As shown in FIG. 17b, the first stop portion 2012b of the first comb-teeth portion 2012 slidably abuts against the second support portion 2022a of one of the second comb-teeth 2022 adjacent to the left side of the first comb-teeth portion 2012, and the first support portion 2012a of the first comb-teeth portion 2012 slidably abuts against the second stop portion 2022b of the other of the second comb-teeth 2022 adjacent to the right side of the first comb-teeth portion 2012

Here, the first support portion 2012a and the second support portion 2022a provide upward support force, and the first stop portion 2012b and the second stop portion 2022b provide downward fixing force, so that the first comb-teeth 2012 and the second comb-teeth 2022 are in a balanced state, thereby achieving the fixing support effect.

By setting a plurality of connection unit structures as described above, the plurality of the first comb-teeth 2012 and the plurality of the second comb-teeth 2022 are snap-fitted together to form a stable structure, which has the good support effect on the flexible display screen 10.

In the prior art, sliders matching with trenches are used to achieve the sliding connection of the first comb-teeth 2012 to the second comb-teeth 2022. For example, the first comb-teeth 2012 are concave trench structures, and the second comb-teeth 2022 are convex sliders corresponding to the concave trenches. The convex sliders slide in the concave trenches, so that the first comb-teeth 2012 can be slidably connected to the second comb-teeth 2022. However, such sliding connection structure has a large sliding contact surface and a large thickness, and occupies an excessive internal space of the display device, thereby seriously affecting the whole duration of the machine.

Figure 7:
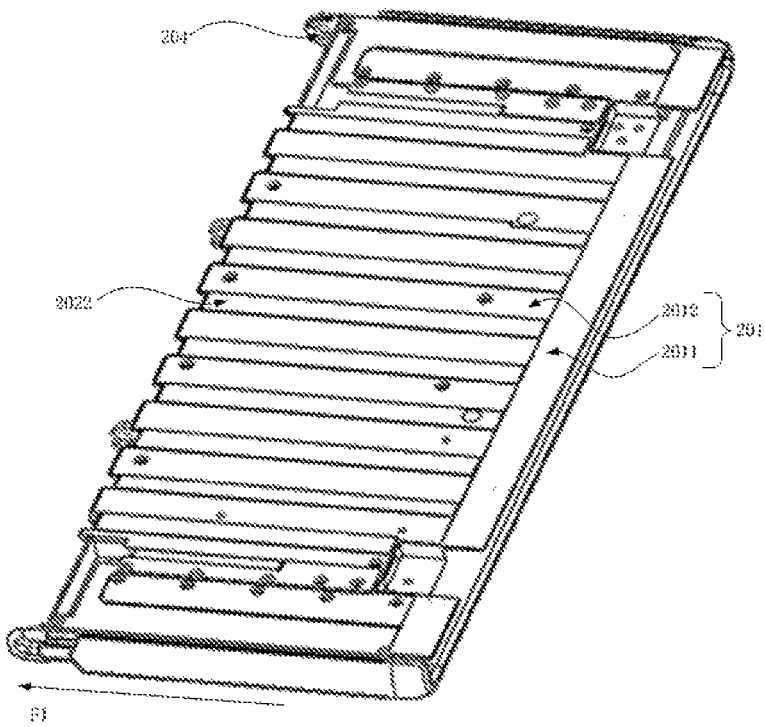
FIG. 7 is a schematic diagram of a support assembly in a retracted state according to an embodiment of the present disclosure.

In an embodiment, as shown in FIGS. 6 and 7, the first comb-teeth 2012 and the second comb-teeth 2022 are set in the Z-shaped configuration, and the first comb-teeth 2012 are snap-fitted and staggered with the adjacent second comb-teeth 2022, so that the first support housing 201 and the second support housing 202 are locked to each other. Since the concave trenches matching with the convex sliders are omitted, the thickness of the support structure is relatively reduced, more internal space is reserved, and thus a battery with a larger capacity can be accommodated therein, thereby improving the overall duration of the display device. Compared with the concave trenches and the convex sliders in the prior art, the contact area between the first comb-teeth 2012 and the second comb-teeth 2022 in the embodiments of the present disclosure is small, which reduces the frictional resistance of sliding between the first comb-teeth 2012 and the second comb-teeth 2022, resulting in smoother sliding and high stability.

In an embodiment, a synchronous drive member may be disposed between the first support housing 201 and the second support housing 202, so that the first support housing 201 and the second support housing 202 are synchronously driven to slide more stably.

In the flexible display device, the first support housing 201 slides with respect to the second support housing 202, so that the flexible display device is switched between the stretched state and the retracted state. In the stretched state, the light-emitting surfaces of the first display portion 101 and the second display portion 102 are located on the same plane, as shown in FIGS. 2, 3, 4, and 5. Among them, FIGS. 2 and 5 show the rear surfaces of the flexible display device in the stretched state. In the retracted state, the light-emitting surface of the first display portion 101 is opposite to the light-emitting surface of the second display portion 102, as shown in FIG. 1.

When the flexible display device is switched from the retracted state to the stretched state, the second support housing 202 moves in the first direction F1 away from the first support housing 201. Meanwhile, a free end of the second display portion 102 moves from a side of the second support housing 202 close to the first support housing 201 to a side of the second support housing 202 away from the first support housing 201, so that the light-emitting surface of the second display portion 102 rotates about the second backbone 2021 of the second support housing 202, and the light-emitting surface of the second display portion 102 is switched from facing the opposite direction to the light-emitting surface of the first display portion 101 to facing the same direction as the light-emitting surface of the first display portion 101.

When the flexible display device is in the retracted state, the first support surface of the first support housing 201 and the second support surface of the second support housing 202 coincide with each other. When the flexible display device is in the stretched state, the first support surface of the first support housing 201 and the second support surface of the second support housing 202 are separated in the same level.

In an embodiment, the support assembly 20 may be a metal or alloy member.

It is to be understood that, the support assembly 20 includes the first support housing 201 including the plurality of first comb-teeth 2012, and the second support housing 202 including the plurality of second comb-teeth 2022. Each of the first comb-teeth 2012 includes the first body portion 2012c, the first support portion 2012a and the first stop portion 2012b, and the first support portion 2012a and the first stop portion 2012b are respectively located on two sides of the first body portion 2012c facing the second comb-teeth 2022. Each of the second comb-teeth 2022 includes the second body portion 2022c, the second support portion 2022a, and the second stop portion 2022b, and the second support portion 2022a and the second stop portion 2022b are respectively located on two sides of the second body portion 2022c facing the first comb-teeth 2012. The first comb-teeth 2012 and the second comb-teeth 2022 are alternately arranged side by side, and are slidably connected to each other in the first direction F1. In the plane perpendicular to the first direction F1, the first support portion 2012a of each of the first comb-teeth 2012 abuts against the second stop portion 2022b of adjacent one of the second comb-teeth 2022 so that the first support portion 2012a supports the second stop portion 2022b, and the second support portion 2022a of each of the second comb-teeth 2022 abuts against the first stop portion 2012b of adjacent one of the first comb-teeth 2012 so that the second support portion 2022a supports the first stop portion 2012b. By this configuration, the first support housing 201 and the second support housing 202 are interlocked with each other. Compared to the concave trenches and convex sliders in the prior art, the contact area of the present disclosure is less, which reduces the frictional resistance between the first comb-teeth 2012 and the second comb-teeth 2022, thereby achieving smoother sliding and high stability. The first support portion 2012a and the first stop portion 2012b are respectively disposed on two sides of each of the first comb-teeth 2012 facing the second comb-teeth 2022, and the second support portion 2022a and the second stop portion 2022b are respectively disposed on two sides of each of the second comb-teeth 2022 facing the first comb-teeth 2012, so that the first comb-teeth 2012 and the second comb-teeth 2022 are snap-fitted with each other. Such structure effectively reduces the overall thickness of the support assembly 20, so that the occupied volume percentage of the support assembly 20 in the flexible display device is low, thereby improving the overall duration of the flexible display device.

In an embodiment, as shown in FIGS. 8 to 17a and 17b, the first support portion 2012a includes a first contact surface C1, the first stop portion 2012b includes a second contact surface C2, the second support portion 2022a includes a third contact surface C3, and the second stop portions 2022b includes a fourth contact surface C4.

In the two second comb-teeth 2022 adjacent to the one first comb-teeth portion 2012, the fourth contact surface C4 of one of the second comb-teeth 2022 slidably abuts against the first contact surface C1 of the first comb-teeth portion 2012, and the third contact surface C3 of the other of the second comb-teeth 2022 slidably abuts against the second contact surface C2 of the first comb-teeth portion 2012.

The first contact surface C1, the second contact surface C2, the third contact surface C3, and the fourth contact surface C4 are flat, and have a preset included angle with the direction perpendicular to the light-emitting surface of the first display portion 101, respectively.

For example, the preset included angle is any non-zero angle, such as 45°, 60°, and 90°, preferably 90°.

It is to be understood that by setting the first contact surface C1, the second contact surface C2, the third contact surface C3, and the fourth contact surface C4 to be flat, the frictional resistance of sliding between the first comb-teeth portion and the second comb-teeth can be further reduced.

Continuing with the above, as shown in FIGS. 8 to 17a and 17b, the first contact surface C1, the second contact surface C2, the third contact surface C3, and the fourth contact surface C4 are parallel to the first display portion 101, respectively.

Specifically, in the one first comb-teeth portion 2012 and the two adjacent second comb-teeth 2022, the first contact surface C1 abuts against the fourth contact surface C4, the second contact surface C2 abuts against the third contact surface C3, and a corresponding support force may be generated due to gravity on the abutting contact surfaces. When the contact surfaces (the first contact surface C1, the second contact surface C2, the third contact surface C3, and the fourth contact surface C4) are inclined, the support force generated by gravity may be correspondingly dispersed, so that the effect of supporting each other between the first comb-teeth portion 2012 and the second comb-teeth 2022 is reduced.

It is to be understood that by setting the first contact surface C1, the second contact surface C2, the third contact surface C3, and the fourth contact surface C4 to be respectively parallel to the first display portion 101, the support force generated is in the direction perpendicular to the first display portion 101 after the first contact surface C1 abuts against the fourth contact surface C4 and the second contact surface C2 abuts against the third contact surface C3, thereby improving the robustness of supporting each other between the first comb-teeth portion 2012 and the second comb-teeth 2022.

In an embodiment, as shown in FIGS. 8 to 17a and 17b, in the direction perpendicular to the first display portion 101, the thickness of the first comb-teeth 2012 is equal to the thickness of the second comb-teeth 2022. The first support portion 2012a and the first stop portion 2012b are disposed between the planes in which two first surfaces lie, and the second support portion 2022a and the second stop portion 2022b are disposed between the planes in which two second surfaces lie.

In the embodiments, the thickness of the first support portion 2012a may be equal to or different from the thickness of the first stop portion 2012b, and the thickness of the second support portion 2022a may be equal to or different from the thickness of the second stop portion 2022b.

It is to be understood that, the thickness of the first comb-teeth 2012 is equal to the thickness of the second comb-teeth 2022, the thickness of each of the first support portion 2012a and the first stop portion 2012b is less than the thickness of the first comb-teeth 2012, the thickness of each of the second support portion 2022a and the second stop portion 2022b is less than the thickness of the first comb-teeth 2012. The first support portion 2012a and the first stop portion 2012b are disposed between the planes in which the two first surfaces lie, and the second support portion 2022a and the second stop portion 2022b are disposed between the planes in which the two second surfaces lie. By this configuration, the thickness of the support assembly 20 can be effectively reduced while ensuring that the first comb-teeth 2012 and the second comb-teeth 2022 slide with a less sliding friction force, so that the interlocking structures of the first comb-teeth 2012 and the second comb-teeth 2022 do not additionally occupy excessive space, and prevents the first support portion 2012a, the first stop portion 2012b, the second support portion 2022a and the second stop portion 2022b from interfering with the normal displaying of the flexible display 10. The interlocking structures of the first comb-teeth 2012 and the second comb-teeth 2022 are disposed on the side surfaces of the two comb-teeth, so that the occupied volume percentage of the support assembly 20 in the flexible display device is low, thereby improving the overall duration of the flexible display device.

Continuing with the above embodiments, as shown in FIGS. 17a and 17b, the first body portion 2012c on each of the first comb-teeth 2012 includes a first upper surface facing the first display portion 101 and a first lower surface away from the first display portion 101. The first support portion 2012a is flush with the first lower surface of the first body portion 2012c, and the first stop portion 2012b is flush with the first upper surface of the first body portion 2012c.

The second body portion 2022c on each of the second comb-teeth 2022 includes a second upper surface facing the first display portion 101 and a second lower surface away from the first display portion 101. The second support portion 2022a is flush with the second lower surface of the second body portion 2022c, and the second stop portion 2022b is flush with the second upper surface of the second body portion 2022c.

Specifically, the first support portion 2012a is flush with the first lower surface of the first body portion 2012c, the first stop portion 2012b is flush with the first upper surface of the first body portion 2012c, the second support portion 2022a is flush with the second lower surface of the second body portion 2022c, and the second stop portion 2022b is flush with the second upper surface of the second body portion 2022c, so that the two support surfaces of the support assembly 20 facing the flexible display screen 10 can have a high surface flatness.

It is to be noted that, the first support portion 2012a and the first stop portion 2012b are disposed on the sides of each of the first comb-teeth 2012, respectively, and the second support portion 2022a and the second stop portion 2022b are disposed on the sides of each of the second comb-teeth 2022, respectively. When the first comb-teeth 2012 slide relative to the second comb-teeth 2022, the support assembly 20 is stretched, and the grooves formed on the side of the support assembly 20 away from the flexible display screen 10 are filled with the support portions, so that the thickness of the grooves is less than that of the concave sliding trenches in the prior art. Therefore, after the flexible display screen 10 is attached to the support assembly 20, it is possible to relieve the sinking feeling when the user presses the flexible display screen 10 during touch control and use, thereby effectively improving the user experience.

It is to be understood that the embodiments of the present disclosure provide the support assembly 20 having less thickness. In addition, the first support portion 2012a and the first stop portion 2012b are disposed on the sides of each of the first comb-teeth 2012, respectively, and the second support portion 2022a and the second stop portion 2022b are disposed on the sides of each of the second comb-teeth 2022, respectively. Therefore, it is possible to further alleviate the sinking of the screen due to the concave and convex surfaces of the support structure when the user presses the screen, during use and touch control of the side-slidable screen display device, thereby effectively improving the user experience.

In an embodiment, as shown in FIGS. 17a and 17b, the first body portion 2012c further includes a first connection surface M1 for connecting the first upper surface and the first contact surface C1, and a second connection surface M2 for connecting the first lower surface and the second contact surface C2. Each of the second support portions 2022a further includes a third connection surface M3 for connecting the second lower surface and the third contact surface C3, and each of the second stop portions 2022b further includes a fourth connection surface M4 for connecting the second upper surface and the fourth contact surface C4.

As shown in FIG. 17a, a first obtuse angle A1 is formed between the first connection surface M1 and the first upper surface, a second obtuse angle A2 is formed between the second connection surface M2 and the first lower surface, a first acute angle B1 is formed between the third connection surface M3 and the second lower surface, and a second acute angle B2 is formed between the fourth connection surface M4 and the second upper surface.

Alternatively, as shown in FIG. 17b, the first acute angle B1 is formed between the first connection surface M1 and the first upper surface, the second acute angle B2 is formed between the second connection surface M2 and the first lower surface, the first obtuse angle A1 is formed between the third connection surface M3 and the second lower surface, and the second obtuse angle A2 is formed between the fourth connection surface M4 and the second upper surface. The first obtuse angle A1 is complementary to the second acute angle B2, and the second obtuse angle A2 is complementary to the first acute angle B1.

Specifically, the first obtuse angle A1 and the second obtuse angle A2 are greater than 90° and less than 180°. The first acute angle B1 and the second acute angle B2 are larger than 0° and less than 90°. The degree of the second acute angle B2 is 60° when the corresponding first obtuse angle A1 is 120°, and the degree of the first acute angle B1 is 30° when the corresponding second obtuse angle A2 is 150°.

Specifically, the degrees of the first obtuse angle A1 and the second obtuse angle A2 may be the same or different, and are not specifically limited. The degree of the first obtuse angle A1 needs to be complementary to the degree of the second acute angle B2, and the degree of the second obtuse angle A2 needs to be complementary to the degree of the first acute angle B1, so that the first connection surface M1 can be fitted to the fourth connection surface M4, and the second connection surface M2 can be fitted to the third connection surface M3.

It is to be understood that, the first connection surface M1 can be fitted to the fourth connection surface M4 (interference fit), the second connection surface M2 can be fitted to the third connection surface M3 (interference fit), and the fitting surfaces thereof are inclined, so that the connection surfaces (the first connection surface M1, the second connection surface M2, the third connection surface M3 and the fourth connection surface M4) can further generate corresponding support force, thereby achieving much better effect of supporting each other between the first comb-teeth 2012 and the second comb-teeth 2022. The angles of the first obtuse angle A1, the second obtuse angle A2, the first acute angle B1 and the second acute angle B2 can be adjusted according to actual production conditions.

As shown in FIGS. 17a and 17b, each of the second body portions 2022c further includes a fifth connection surface M5 for connecting the second upper surface and the third contact surface C3, and a sixth connection surface M6 for connecting the second lower surface and the fourth contact surface C4. The first support portion 2012a further includes a seventh connection surface M7 for connecting the first lower surface and the first contact surface C1, and the first stop portion 2012b further includes an eighth connection surface M8 for connecting the first upper surface and the second contact surface C2.

As shown in FIG. 17a, a third obtuse angle A3 is formed between the fifth connection surface M5 and the second upper surface, a fourth obtuse angle A4 is formed between the sixth connection surface M6 and the second lower surface, a third acute angle B3 is formed between the seventh connection surface M7 and the first lower surface, and a fourth acute angle B4 is formed between the eighth connection surface M8 and the first upper surface.

Alternatively, as shown in FIG. 17b, the third acute angle B3 is formed between the fifth connection surface M5 and the second upper surface, the fourth acute angle B4 is formed between the sixth connection surface M6 and the second lower surface, the third obtuse angle A3 is formed between the seventh connection surface M7 and the first lower surface, and the fourth obtuse angle A4 is formed between the eighth connection surface M8 and the first upper surface. The third obtuse angle A3 is complementary to the fourth acute angle B4, and the fourth obtuse angle A4 is complementary to the third acute angle B3.

The third obtuse angle A3 and the fourth obtuse angle A4 are greater than 90° and less than 180°. The third acute angle B3 and the fourth acute angle B4 are larger than 0° and less than 90°. When the third obtuse angle A3 is 120°, the degree of the corresponding fourth acute angle B4 is 60°. When the fourth obtuse angle A4 is 150°, the degree of the corresponding third acute angle B3 is 30°.

Specifically, the degrees of the third obtuse angle A3 and the fourth obtuse angle A4 may be the same or different, and are not specifically limited. The degree of the third obtuse angle A3 needs to be complementary to the degree of the fourth acute angle B4, and the degree of the fourth obtuse angle A4 needs to be complementary to the degree of the third acute angle B3, so that the fifth connection surface M5 can be fitted to the eighth connection surface M8, and the sixth connection surface M6 can be fitted to the seventh connection surface M7.

It is to be understood that, the fifth connection surface M5 can be fitted to the eighth connection surface M8 (interference fit), the sixth connection surface M6 can be fitted to the seventh connection surface M7 (interference fit), and the fitting surfaces thereof are inclined, so that the connection surfaces (the fifth connection surface M5, the sixth connection surface M6, the seventh connection surface M7, and the eighth connection surface M8) can further generate corresponding support force, thereby achieving much better effect of supporting each other between the first comb-teeth 2012 and the second comb-teeth 2022. The angles of the third obtuse angle A3, the fourth obtuse angle A4, the third acute angle B3, and the fourth acute angle B4 can be adjusted according to actual production conditions.

In an embodiment, all of the first connection surface M1, the second connection surface M2, the third connection surface M3, the fourth connection surface M4, the fifth connection surface M5, the sixth connection surface M6, the seventh connection surface M7, and the eighth connection surface M8 are perpendicular to the first display portion 101. The first connection surface M1 is spaced apart from the fourth connection surface M4, the second connection surface M2 is spaced apart from the third connection surface M3, the fifth connection surface M5 is spaced apart from the eighth connection surface M8, and the sixth connection surface M6 is spaced apart from the seventh connection surface M7.

It is to be understood that, the first connection surface M1, the second connection surface M2, the third connection surface M3, the fourth connection surface M4, the fifth connection surface M5, the sixth connection surface M6, the seventh connection surface M7, and the eighth connection surface M8 are all perpendicular to the first display portion 101, and the corresponding connection surfaces are spaced apart from each other, so that the first comb-teeth 2012 abut against the second comb-teeth 2022 only by the first contact surface C1, the second contact surface C2, the third contact surface C3, and the fourth contact surface C4. Therefore, the sliding friction force between the first comb-teeth 2012 and the second comb-teeth 2022 is minimized, and the sliding between the first support housing 201 and the second support housing 202 is much smoother.

In an embodiment, a side surface of the first stop portion 2012b facing the first display portion 101 is flush with a side surface of the first body portion 2012c facing the first display portion 101, a side surface of each of the second stop portions 2022b facing the first display portion 101 is flush with a side surface of each of the second body portions 2022c facing the first display portion 101, and the side surface of the first comb-teeth portion 2012 facing the first display portion 101 is flush with a side surface of each of the second comb-teeth 2022 facing the first display portion 101.

Specifically, as shown in FIGS. 10 to 16, the thickness of the first stop portion 2012b, the first support portion 2012a, the second stop portion 2022b, and the second support portion 2022a is not limited in the embodiments of the present disclosure. However, after the first stop portion 2012b abuts against the second support portion 2022a, the side of the first stop portion 2012b facing the first display portion 101 is flush with the side of the first body portion 2012c facing the first display portion 101. After the second stop portion 2022b abuts against the first support portion 2012a, the side of the second stop portion 2022b facing the first display portion 101 is flush with the side of the second body portion 2022c facing the first display portion 101. That is, the side of the support assembly 20 facing the first display portion 101 has a relatively high surface flatness.

It is to be understood that, the side surface of the first stop portion 2012b facing the first display portion 101 is flush with the side surface of the first body portion 2012c facing the first display portion 101, the side surface of the second stop portion 2022b facing the first display portion 101 is flush with the side surface of the second body portion 2022c facing the first display portion 101, and the side surface of each of the first comb-teeth 2012 facing the first display portion 101 is flush with the side surface of each of the second comb-teeth 2022 facing the first display portion 101, so that the flatness of the support surface of the support assembly 20 of the flexible display screen 10 is higher. When the user touches the flexible display panel, the flexible display panel is not easily deformed, thereby reducing the depression during pressing and touch control by the user and improving the experience sensation of the user.

In an embodiment, as shown in FIGS. 18-21, the support assembly 20 further includes a slide assembly 203. The slide assembly 203 includes an outer frame 213; and a first lead screw member, including a first lead screw 2031 and a first guide rod 2032 disposed parallel to the first lead screw 2031, wherein the first lead screw 2031 is rotatably connected to the outer frame 213, the first guide rod 2032 is fixedly disposed to the outer frame 213. A first slider 2033 reciprocating in an axial direction of the first lead screw 2031 is disposed on the first lead screw 2031 and the first guide rod 2032, the first slider 2033 is rotatably connected to the first lead screw 2031, and the first slider 2033 is slidably connected to the first guide rod 2032;

a second lead screw member, including a second lead screw 2034 disposed parallel to the first lead screw 2031, and a second guide rod 2035 disposed parallel to the second lead screw 2034, wherein the second lead screw 2034 is rotatably connected to the outer frame 213 and is in synchronous reverse rotation connection with the first lead screw 2031, the second guide rod 2035 is fixedly disposed on the outer frame 213. A second slider 2036 reciprocating in the axial direction of the second lead screw 2034*t* is disposed on the second lead screw 2034 and the second guide rod 2035, the second slider 2036 is rotatably connected to the second lead screw 2034, and the second slider 2036 is slidably connected to the second guide rod 2035.

The outer frame 213 is fixedly connected to the second support housing 202, the first slider 2033 is fixedly connected to the first support housing 201, the second slider 2036 is fixedly connected to the second display portion 102, and the axial direction of the first lead screw 2031 is parallel to the first direction F1.

Figure 19:
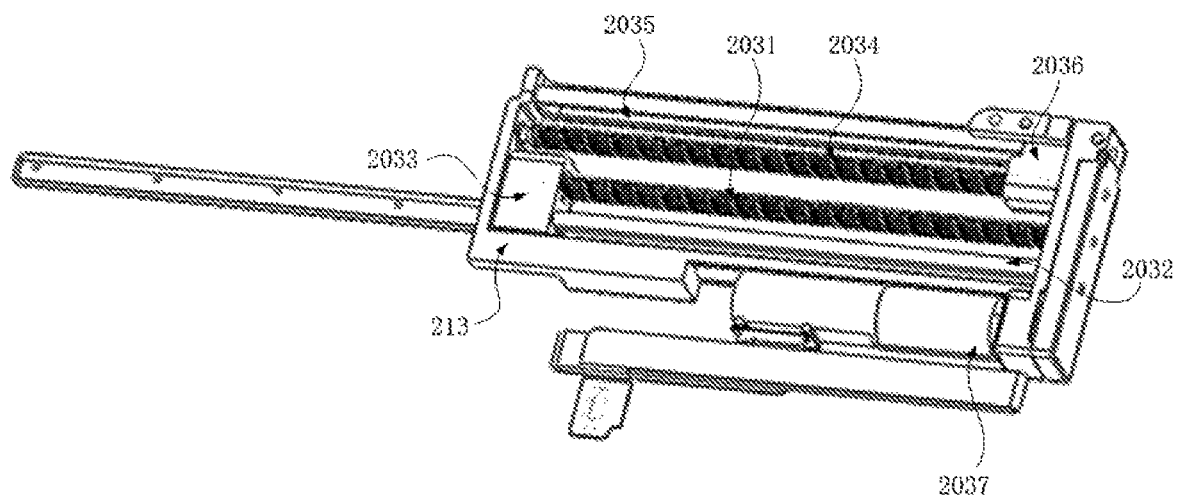
FIG. 19 is a schematic structural diagram of a slide assembly in a retracted state according to an embodiment of the present disclosure.
Figure 20:
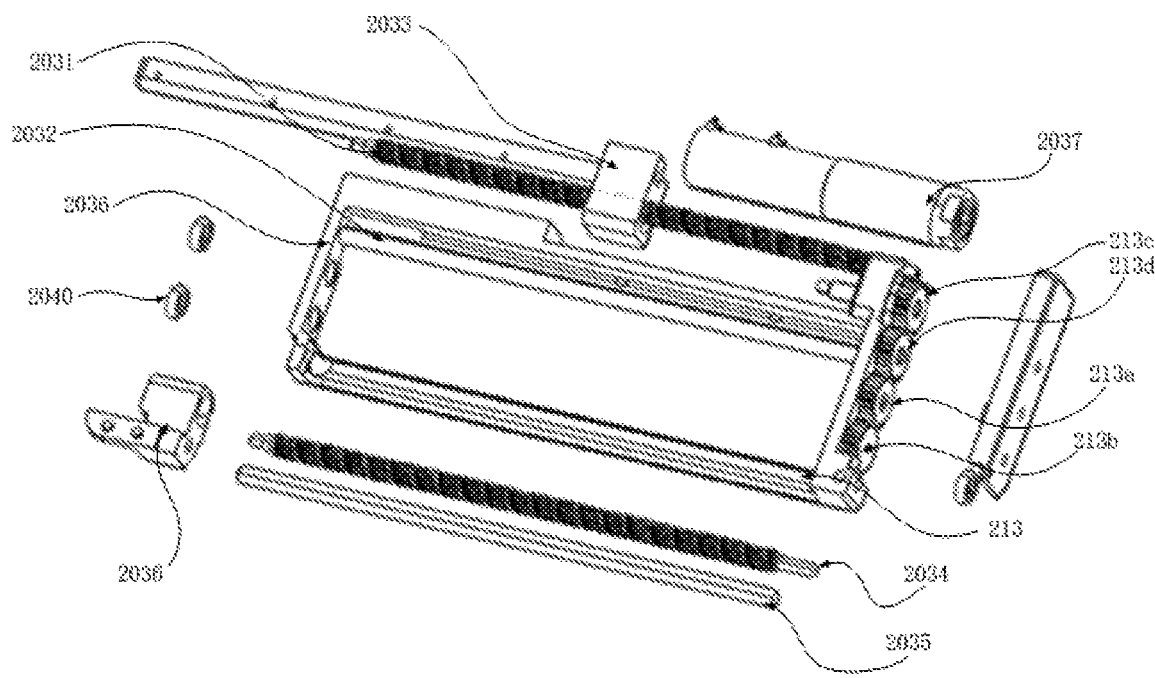
FIG. 20 is a schematic diagram of parts of a slide assembly according to an embodiment of the present disclosure.
Figure 21:
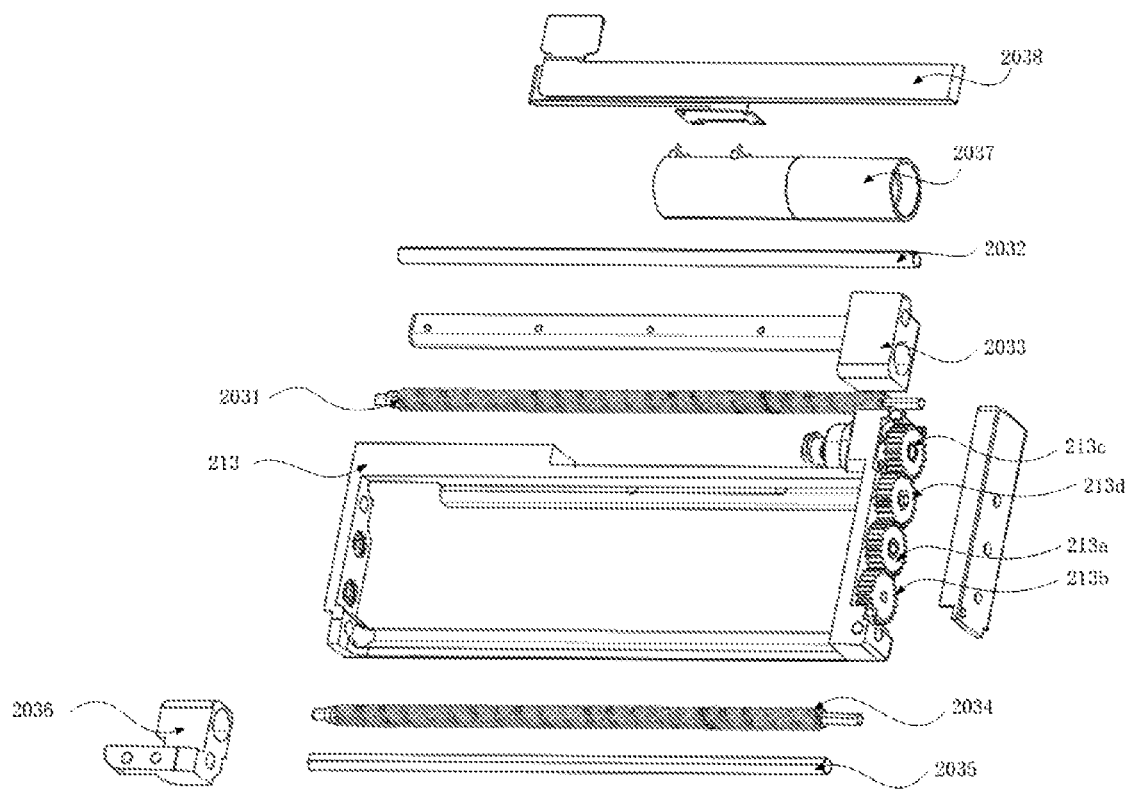
FIG. 21 is an exploded view of a slide assembly according to an embodiment of the present disclosure.

As shown in FIGS. 19, 20 and 21, the outer frame 213 is a square frame. The first lead screw 2031 and the second lead screw 2034 are each disposed along the length direction of the outer frame 213 and located within the outer frame 213, and the first guide rod 2032 and the second guide rod 2035 are each disposed along the length direction of the outer frame 213 and located within the outer frame 213.

Specifically, external threads are disposed on the first lead screw 2031 and the second lead screw 2034. The external threads on the first lead screw 2031 have the same rotation direction as the external threads on the second lead screw 2034. Internal threads matching with the external threads on the first lead screw 2031 are disposed on the first slider 2033, and internal threads matching with the external threads on the second lead screw 2034 are disposed on the second slider 2036.

Specifically, the first lead screw 2031 and the second lead screw 2034 are rotatably connected to the outer frame 213 by a rotating bearing 2040, and the synchronous reverse rotation between the second lead screw 2034 and the first lead screw 2031 is achieved by a set of gears. In a specific example, a first bearing is sleeved on an end of the first lead screw 2031, a second bearing is sleeved on an end of the second lead screw 2034. The other end of the first lead screw 2031 extends through the outer frame 213 (a through-hole is disposed on the corresponding position on the outer frame 213) and is fixedly connected to a first gear 213*a*. The other end of the second lead screw 2034 extends through the outer frame 213 (a through-hole is disposed on the corresponding position on the outer frame 213) and is fixedly connected to a second gear 213*b*. The first gear 213*a* is engaged to the second gear 213*b*, and the first gear 213*a* and the second gear 213*b* are rotatably connected to the outer frame 213. The first bearing is fixedly disposed on the outer frame 213.

Specifically, the first slider 2033 is sleeved on the first guide rod 2032, and the first slider 2033 is spaced apart from the first guide rod 2032. The second slider 2036 is sleeved on the second guide rod 2035, and the second slider 2036 is spaced apart from the second guide rod 2035.

Specifically, as shown in FIGS. 19 and 20, when the first gear 213*a* is rotated, the first lead screw 2031 is driven to rotate. The second gear 213*b* is rotated in an opposite direction to the first gear 213*a*, and the rotation direction of the second lead screw 2034 is opposite to the rotation direction of the first lead screw 2031. The first slider 2033 and the second slider 2036 are oppositely moved to each other in the first direction F1.

Specifically, the outer frame 213 is fixedly connected to the second support housing 202, the first slider 2033 is fixedly connected to the first support housing 201, the second slider 2036 is fixedly connected to the second display portion 102, and the axial direction of the first lead screw 2031 is parallel to the first direction F1.

Specifically, a support rod is disposed on the first slider 2033. The support rod is fixedly connected to the first support housing 201.

Specifically, the outer frame 213, the first lead screw 2031, the second lead screw 2034, the first guide rod 2032, the second guide rod 2035, the first slider 2033, and the second slider 2036 are metal pieces.

In an embodiment, as shown in FIG. 20, the first lead screw 2031 and the second lead screw 2034 are connected to each other by a synchronous drive member comprising the followings:

the first gear 213*a* and the second gear 213*b* with the same number of teeth as the first gear 213*a*, wherein the first gear 213*a* is connected to the first lead screw 2031, the second gear 213*b* is connected to the second lead screw 2034, and the first gear 213*a* is engaged with the second gear 213*b* to rotate the first lead screw 2031 in the reverse direction in synchronism with the second lead screw 2034.

Specifically, the diameter of the first gear 213*a* and the second gear 213*b* is less than the thickness of the outer frame 213.

Specifically, the first gear 213*a* and the second gear 213*b* may be metal pieces.

It is to be understood that the synchronous reverse rotation and connection of the first lead screw 2031 with the second lead screw 2034 is achieved by the first gear 213*a* and the second gear 213*b*, and thus it is simple in structure, low in precision requirement, low in production cost, and suitable for mass production.

In an embodiment, as shown in FIG. 20, the synchronous drive member further includes a rotating motor 2037. A third gear 213*c* is connected to a shaft of the rotating motor 2037, and rotatably connected to the outer frame 213. The shaft of the rotating motor 2037 is fixedly connected with the third gear 213*c*, and the third gear 213*c* is engaged with the first gear 213*a* or the second gear 213*b*.

Specifically, the rotating motor 2037 includes an external circuit 2038. The external circuit 2038 is externally connected to a control module and a power supply of the flexible display device and controls rotation of a rotating electrode, thereby automating the relative movement of the first support housing 201 and the second support housing 202.

Specifically, in a specific example, as shown in FIGS. 20 and 21, the rotating motor 2037 is fixedly disposed on the outer frame 213, the third gear 213*c* is rotatably connected to the outer frame 213, the third gear 213*c* is fixedly connected to the shaft of the rotating motor 2037, the third gear 213*c* is engaged with a fourth gear 213*d*, and the fourth gear 213*d* is engaged with the first gear 213*a*.

It is to be understood that the rotation of the rotating motor 2037 is controlled by the control module of the flexible display device, thereby controlling the rotation of the third gear 213*c* to drive the rotation of the first gear 213*a* or the second gear 213*b*, and automating the relative sliding of the first support housing 201 with the second housing 202.

The present disclosure further provides a support assembly 20 comprising the followings:

the support assembly 20 including the first support housing 201 and the second support housing 202 slidably connected to the first support housing 201 in a first direction F1. The plurality of first comb-teeth 2012 parallel to the first direction F1 are disposed on the first support housing 201, and the plurality of second comb-teeth 2022 parallel to the first comb-teeth 2012 are disposed on the second support housing 202. The first comb-teeth 2012 and the second comb-teeth 2022 are alternately arranged side by side and slidably connected to each other in the first direction F1.

Each of the first comb-teeth 2012 includes the first body portion 2012c, the first support portion 2012a, and the first stop portion 2012b. The first support portion 2012a and the first stop portion 2012b are located on two sides of the first body portion 2012c facing the second comb-teeth 2022, respectively. Each of the second comb-teeth 2022 includes the second body portion 2022c, the second support portion 2022a, and the second stop portion 2022b. The second support portion 2022a and the second stop portion 2022b are located on two sides of the second body portion 2022c facing the first comb-teeth 2012, respectively. In the plane perpendicular to the first direction F1, the cross sections of the first comb-teeth 2012 and the second comb-teeth 2022 are Z-shaped. In two second comb-teeth 2022 adjacent to one first comb-teeth portion 2012, the second support portion 2022a of one of the second comb-teeth 2022 abuts against the first stop portion 2012b of the first comb-teeth portion 2012 and is slidable in the first direction F1, and the second stop portion 2022b of the other second comb-teeth portion 2022 abuts against the first support portion 2012a of the first comb-teeth portion 2012 and is slidable in the first direction F1.

Specifically, the structure and material of the support assembly 20 may be set with reference to the above embodiments of the flexible display device, and details are not repeated herein.

It is to be understood that, for those of ordinary skill in the art, equivalent substitutions or modifications may be made based on the technical solutions of the present disclosure and the inventive concept thereof, and all such modifications or substitutions are intended to fall within the scope of the appended claims.

What is claimed is:

1. A flexible display device, comprising:
   a support assembly comprising a first support housing and a second support housing slidably connected to the first support housing in a first direction; and
   a flexible display screen comprising a first display portion and a second display portion,
   wherein the second support housing is configured to slide toward or away from the first support housing in the first direction to drive the second display portion to switch between a first state, in which a light-emitting surface of the second display portion and that of the first display portion face opposite directions respectively, and a second state, in which the light-emitting surface of the second display portion faces a same direction as the light-emitting surface of the first display portion;
   the first support housing comprises a plurality of first comb-teeth parallel to the first direction, and the second support housing comprises a plurality of second comb-teeth parallel to the first comb-teeth;
   each of the first comb-teeth comprises a first body portion, a first support portion, and a first stop portion, the first support portion and the first stop portion being respectively on opposite sides of the first body portion respectively facing two of the second comb-teeth, and each of the second comb-teeth comprises a second body portion, a second support portion, and a second stop portion, the second support portion and the second stop portion being respectively on opposite sides of the second body portion respectively facing two of the first comb-teeth;
   for each of the first comb-teeth, the first body portion comprises a first upper surface close to the first display portion and a first lower surface away from the first display portion, the first support portion is flush with the first lower surface of the first body portion, and the first stop portion is flush with the first upper surface of the first body portion;
   for each of the second comb-teeth, the second body portion comprise a second upper surface close to the first display portion and a second lower surface away from the first display portion, the second support portion is flush with the second lower surface of the second body portion, and the second stop portion is flush with the second upper surface of the second body portion,
   the first comb-teeth and the second comb-teeth are alternately arranged side by side and are slidably connected to each other in the first direction;
   the first support portion of each of the first comb-teeth abuts against the second stop portion of one of the second comb-teeth adjacent to the each of the first comb-teeth, so that the first support portion supports the second stop portion in a direction perpendicular to the light-emitting surface of the first display portion; and
   the second support portion of each of the second comb-teeth abuts against the first stop portion of one of the first comb-teeth adjacent to the each of the second comb-teeth, so that the second support portion supports the first stop portion in the direction perpendicular to the light-emitting surface of the first display portion.

2. The flexible display device according to claim 1, wherein the first support portion comprises a first contact surface, the first stop portion comprises a second contact surface, the second support portion comprises a third contact surface, and the second stop portion comprises a fourth contact surface; and
   for each one of the first comb-teeth, the fourth contact surface of one of two ones of the second comb-teeth adjacent to the each one of the first comb-teeth slidably abuts against the first contact surface of the each one of the first comb-teeth, and the third contact surface of another one of the two ones of the second comb-teeth slidably abuts against the second contact surface of the each one of first comb-teeth.

3. The flexible display device according to claim 2, wherein each of the first contact surface, the second contact surface, the third contact surface, and the fourth contact surface is a plane, and forms a preset included angle with the direction perpendicular to the light-emitting surface of the first display portion.

4. The flexible display device according to claim 3, wherein each of the first contact surface, the second contact surface, the third contact surface, and the fourth contact surface is parallel to the first display portion.

5. The flexible display device according to claim 2, wherein a thickness of each of the first comb-teeth is equal to a thickness of each of the second comb-teeth in the direction perpendicular to the light-emitting surface of the first display portion.

6. The flexible display device according to claim 2, wherein the first body portion further comprises a first connection surface for connecting the first upper surface and the first contact surface, and a second connection surface for connecting the first lower surface and the second contact surface; and the second support portion further comprises a third connection surface for connecting the second lower surface and the third contact surface, and the second stop portion further comprises a fourth connection surface for connecting the second upper surface and the fourth contact surface.

7. The flexible display device according to claim 6, wherein a first obtuse angle is formed between the first connection surface and the first upper surface, and a second obtuse angle is formed between the second connection surface and the first lower surface, a first acute angle is formed between the third connection surface and the second lower surface, and a second acute angle is formed between the fourth connection surface and the second upper surface, and the first obtuse angle is complementary to the second acute angle, and the second obtuse angle is complementary to the first acute angle.

8. The flexible display device according to claim 6, wherein a first acute angle is formed between the first connection surface and the first upper surface, and a second acute angle is formed between the second connection surface and the first lower surface, a first obtuse angle is formed between the third connection surface and the second lower surface, and a second obtuse angle is formed between the fourth connection surface and the second upper surface, and the first obtuse angle is complementary to the second acute angle, and the second obtuse angle is complementary to the first acute angle.

9. The flexible display device according to claim 2, wherein the second body portion further comprises a fifth connection surface for connecting the second upper surface and the third contact surface, and a sixth connection surface for connecting the second lower surface and the fourth contact surface; and the first support portion further comprises a seventh connection surface for connecting the first lower surface and the first contact surface, and the first stop portion further comprises an eighth connection surface for connecting the first upper surface and the second contact surface.

10. The flexible display device according to claim 9, wherein a third obtuse angle is formed between the fifth connection surface and the second upper surface, and a fourth obtuse angle is formed between the sixth connection surface and the second lower surface, and a third acute angle is formed between the seventh connection surface and the first lower surface, and a fourth acute angle is formed between the eighth connection surface and the first upper surface, and the third obtuse angle is complementary to the fourth acute angle, and the fourth obtuse angle is complementary to the third acute angle.

11. The flexible display device according to claim 9, wherein a third acute angle is formed between the fifth connection surface and the second upper surface, and a fourth acute angle is formed between the sixth connection surface and the second lower surface, a third obtuse angle is formed between the seventh connection surface and the first lower surface, and a fourth obtuse angle is formed between the eighth connection surface and the first upper surface, and the third obtuse angle is complementary to the fourth acute angle, and the fourth obtuse angle is complementary to the third acute angle.

12. The flexible display device according to claim 1, wherein the first display portion is fixedly connected to the first support housing, the second display portion is disposed around a periphery of the second support housing in the first direction, and the second display portion is slidably connected to the second support housing in the first direction.

13. The flexible display device according to claim 12, wherein the support assembly further comprises a slide assembly comprising:

an outer frame;

a first lead screw member comprising a first lead screw and a first guide rod disposed parallel to the first lead screw, wherein the first lead screw is rotatably connected to the outer frame, the first guide rod is fixedly disposed on the outer frame, a first slider capable of reciprocating along an axial direction of the first lead screw is disposed on the first lead screw and the first guide rod, and the first slider is rotatably connected to the first lead screw and slidably connected to the first guide rod; and a second lead screw member comprising a second lead screw and a second guide rod disposed parallel to the second lead screw, wherein the second lead screw is rotatably connected to the outer frame and is connected with the first lead screw for synchronous reverse rotation, the second guide rod is fixedly disposed on the outer frame, a second slider capable of reciprocating along an axial direction of the second lead screw is disposed on the second lead screw and the second guide rod, and the second slider is rotatably connected to the second lead screw and slidably connected to the second guide rod.

14. The flexible display device according to claim 13, wherein the outer frame is fixedly connected to the second support housing, the first slider is fixedly connected to the first support housing, the second slider is fixedly connected to the second display portion, and the axial direction of the first lead screw is parallel to the first direction.

15. The flexible display device according to claim 14, wherein the first lead screw is connected to the second lead screw for synchronous reverse rotation by a synchronous drive member comprising:

a first gear and a second gear having a same number of teeth as the first gear, wherein the first gear is connected to the first lead screw, the second gear is connected to the second lead screw, and the first gear is engaged with the second gear to enable the first lead screw and the second lead screw to synchronously and reversely rotate.

16. The flexible display device according to claim 15, wherein the synchronous drive member further comprises a rotation motor, a third gear is rotatably connected to the outer frame, a shaft of the rotation motor is fixedly connected to the third gear, and the third gear is engaged with the first gear or the second gear.

17. A support assembly comprising:

a first support housing comprising a plurality of first comb-teeth parallel to a first direction, wherein each of the first comb-teeth comprises a first body portion, a first support portion, and a first stop portion, and the first support portion and the first stop portion are respectively on opposite sides of the first body portion; and a second support housing being slidably connected to the first support housing in the first direction and comprising a plurality of second comb-teeth parallel to the first comb-teeth, wherein each of the second comb-teeth comprises a second body portion, a second support portion, and a second stop portion, and the second support portion and the second stop portion are respectively on opposite sides of the second body portion respectively facing two of the first comb-teeth, wherein for each of the first comb-teeth, the first body portion comprises a first upper surface close to the first display portion and a first lower surface away from the first display portion, the first support portion is flush with the first lower surface of the first body portion, and the first stop portion is flush with the first upper surface of the first body portion;

for each of the second comb-teeth, the second body portion comprise a second upper surface close to the first display portion and a second lower surface away from the first display portion, the second support portion is flush with the second lower surface of the second body portion, and the second stop portion is flush with the second upper surface of the second body portion, the first comb-teeth and the second comb-teeth are alternately arranged side by side and are slidably connected to each other in the first direction;

the first support portion of each of the first comb-teeth abuts against the second stop portion of one of the second comb-teeth adjacent to the each of the first comb-teeth, so that the first support portion supports the second stop portion in a direction perpendicular to the first support housing; and the second support portion of each of the second comb-teeth abuts against the first stop portion of one of the first comb-teeth adjacent to the each of the second comb-teeth, so that the second support portion supports the first stop portion in the direction perpendicular to the first support housing.

18. The support assembly of claim 17, wherein the first support portion comprises a first contact surface, the first stop portion comprises a second contact surface, the second support portion comprises a third contact surface, and the second stop portion comprises a fourth contact surface; and for each one of the first comb-teeth, the fourth contact surface of one of two ones of the second comb-teeth adjacent to the each one of the first comb-teeth slidably abuts against the first contact surface of the each one of the first comb-teeth, and the third contact surface of another one of the two ones of the second comb-teeth slidably abuts against the second contact surface of the each one of first comb-teeth.

19. The support assembly according to claim 18, wherein a thickness of each of the first comb-teeth is equal to a thickness of each of the second comb-teeth.

* * * * *